Aug. 17, 1926.

W. D. LEGGE ET AL 1,596,196

STUB AXLE MOUNT

Filed May 31, 1923

INVENTORS.
William D. Legge
and Curran C. McConville
by Erwin, Wheeler & Noolan
ATTORNEYS Patented Aug. 17, 1926.

1,596,196

UNITED STATES PATENT OFFICE.

WILLIAM D. LEGGE AND CURRAN C. McCONVILLE, OF CLINTONVILLE, WISCONSIN, ASSIGNOR TO THE FOUR WHEEL DRIVE AUTO COMPANY, OF CLINTONVILLE, WISCONSIN.

STUB-AXLE MOUNT.

Application filed May 31, 1923. Serial No. 642,650.

This invention relates to improvements in steering axle structures of the general type disclosed in Letters Patent of the United States granted to Four Wheel Drive Auto Company No. 1,205,965, dated November 18, 1916.

The object of this invention is to provide means for reducing to a minimum the frictional resistance to steering movements of the stub axle; to provide improved end friction bearings associated with replaceable self centering parts adapted to protect the more expensive portions of the stub axle structure from deteriorations or wear; and, in general, to provide a self centering steering axle structure which can be maintained at minimum expense in efficient working condition through long periods of time and to allow the stub axle to be actuated for steering purposes with minimum power.

In the drawings:—

Like parts are identified by the same reference characters throughout the several views.

Figure 1:
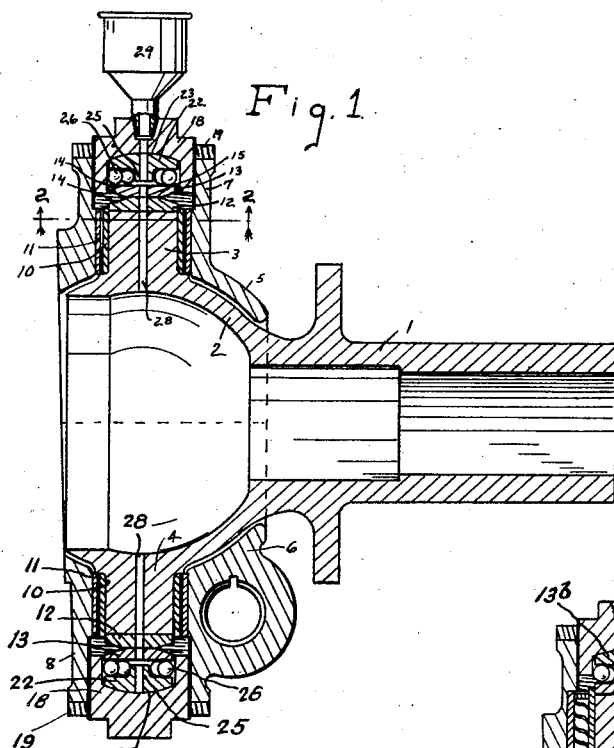
Figure 1 is a vertical sectional view of the jointed portion of a steering axle structure.
Figure 2:
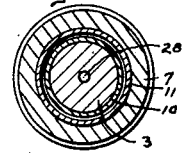
Figure 2 is a sectional view drawn to line 2—2 of Figure 1.

The supporting axle member 1 is provided at its inner end with a spherically rounded portion 2 having exterior vertically projecting upper and lower pivot studs 3 and 4 respectively. The housing members or stub axle sections 5 and 6 have vertically projecting stud receiving sleeves 7 and 8 respectively, into which the studs 3 and 4 project when the parts are assembled. These parts are shown in said former patent and for the purpose of this disclosure may be assumed to be of any ordinary construction.

In Figure 1 the pivot studs 3 and 4 are protected by removable bearing sleeves 10 and the tubular members 7 and 8 have their inner surfaces similarly protected by concentric removable bushings 11. The bearing sleeves 10 extend for a short distance beyond the ends of the pivot studs 3 (or 4) and serve as retainers for a thrust bearing button 12, the outer portion of which is in the form of a truncated cone of low pitch. This bearing button 12 is surmounted by a similarly formed, but inverted, button shaped bearing member 13. The conically tapered faces 14 of the buttons 12 and 13 provide clearance between their margins and the flat contacting areas 15 are, therefore, of comparatively small dimensions.

The bearing button 13 is retained by a socketed cap nut 18 having screw threaded engagement in the housing sleeves 7 and 8 and secured by a lock nut 19. The sockets of the cap nuts 18 are of sufficient depth to receive antifriction bearings. These may be conveniently formed as shown in Figure 1. An outer thrust bearing member 22 is formed to fit the spherically rounded base 23 of the cap nut socket and the inner face of this member 22 is provided with a stud 25 in line with the pivotal axis. The spaces within the sockets concentric to the studs 25 are filled with loose balls 26, these balls being interposed between the opposing flat faces of the outer bearing members 22 and the button shaped members 15. The balls will, of course, oscillate in a circular path about the pivot studs 25 during steering movements of the stub axle.

By having the marginal portions of the thrust bearing members or buttons 12 and 13 separated from each other, the annular marginal portion of the thrust member 13 will yield slightly under excessive pressure, such as might be developed either by shock, or by an eccentric ball, or a ball of greater diameter than the others. Each of the thrust bearing members or buttons is of slightly less transverse diameter than its socket, whereby it is adapted to shift and adjust itself to the conditions of use. This is also facilitated by the spherically rounded surface 23 at the base of the socket in the cap nut 18 and the correspondingly spherically rounded surface of the bearing member 22.

Figure 3:
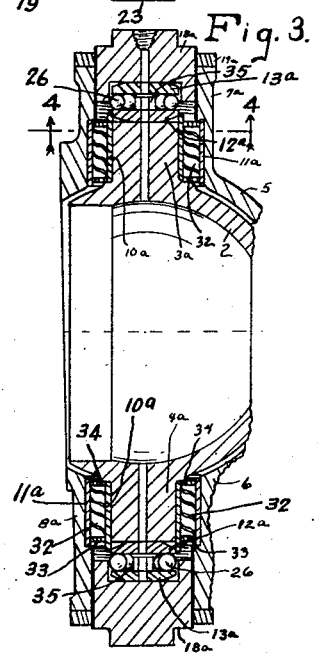
Figure 3 is a view similar to Figure 1 showing a structural modification.
Figure 4:
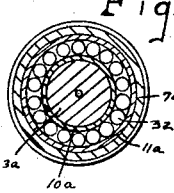
Figure 4 is a sectional view drawn to line 4—4 of Figure 3.

It will be observed that an oil duct 28 extends downwardly through the cap nut 18 and through the various thrust bearing members 22, 13 and 12 and also through the pivot stud 3 (or 4), whereby adequate lubrication may be provided from any suitable source of supply such, for example, as the oil cup 29. The oil duct is utilized to not only feed oil to the parts in the spherical axle portion 2 and through the pivot stud 4 to the lower thrust bearing members, but the oil is also permitted to feed radially between the thrust bearing members. This is particularly facilitated by having the pivot stud 25 spaced from the button shaped bearing member 13. Referring to Figure 3, it will be observed that the sleeve sockets 7ª and 8ª are relatively enlarged at their inner ends as compared with the structure disclosed in Figure 1, wherein the outer ends of the sleeve sockets are slightly enlarged in those portions which receive the cap nuts 18. In Figure 3 the bushings 11ª are inserted from within the housing members or stub axle sections 5 and 6 and fit the enlarged inner end portions of the sleeve sockets. The bearing sleeves 10ª are fitted to the pivot stud 3ª (or 4ª) and these studs are slightly reduced in transverse diameter as compared with those disclosed in Figure 1, whereby the bushings or sleeves 10ª and 11ª are spaced apart sufficiently to receive vertically disposed rollers 32, the ends of which are seated against cage rings 33 and 34. These roller bearings may of course be employed, if desired, in the structures disclosed in Figure 1 by providing the necessary clearance between the sleeves 7 (or 8) and the pivot studs 3 (or 4).

In the construction shown in Figure 3, the balls 26 are interposed between the thrust bearing members 12ª and 13ª, these members in each case being inverted from the position of the members 12 and 13 in Figure 1, whereby the conically tapered faces are opposed respectively to the ends of the pivot studs 3ª (or 4ª) and the bases of the sockets in the cap nuts 18ª. A collar or short piece of tubing 35, loosely inserted between the thrust bearing members 12ª and 13ª, may be used to keep the balls away from the central axis. If this collar were not used, one of the balls might become seated in a position to close the oil duct.

Figure 5:
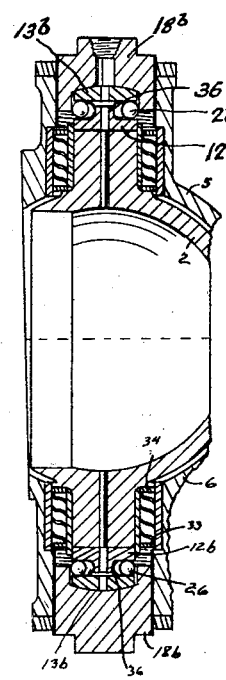
Figure 5 is another view similar to Figure 1 showing a further modification.

In Figure 5 the construction is identical with that disclosed in Figure 3 except as to the thrust bearing members and the cap nut 18ᵇ, the latter being closely similar to the cap nut disclosed in Figure 1 except that it has a socket of less depth, only two thrust bearing button members being provided. The inner button member 12ᵇ is provided with an outwardly projecting stud 36 to space the balls from the center and the outer thrust bearing button 13ᵇ is fitted to a spherically rounded base of the socket in the cap nut 18ᵇ. The balls 26 are interposed between these button shaped bearing members 12ᵇ and 13ᵇ to produce an anti-friction bearing closely similar to that disclosed in Figure 1, but without any provision for a yielding of the peripheral margin of either of the bearing buttons. The separation of the peripheral margin of one of the bearing members from the other or from the wall of the member against which it seats is not essential, but it is very desirable, both for the purpose of incorporating in the bearing a slight yielding characteristic and also for the purpose of reducing the thrust area and allowing the buttons to automatically center and adjust themselves to the line of thrust pressure.

It will be seen that in all of the several modifications illustrated and above described, the annular wall of the socketed cap nuts which close the outer ends of the sleeves or housings in which the pivot studs of the axle member are received, acts as a means to confine the balls 26 against outward radial movement relative to the axis of said pivot studs.

Said socketed nuts also receive the outer button-shaped thrust bearing member and are very important in providing a compact arrangement of parts.

We claim:—

1. In a steering axle structure, the combination of an axle supporting member having a pair of vertically disposed aligned pivot studs, sleeve housings for said studs, a socketed cap nut fitted to the outer end of each of the sleeves, a plurality of removable button-shaped thrust bearing members interposed between the end of each pivot stud and the base of the socket in the cap nut associated with said stud, and a series of anti-friction balls interposed between two of said thrust bearing members and confined against outward radial movement relative to the axis of the stud by the annular wall of the socket in the cap nut.

2. In a steering axle structure, the combination of an axle supporting member having two vertically disposed oppositely projecting pivot studs, tubular housing members receiving said studs, cap nuts closing the outer ends of the housings, ball bearings between the ends of the studs and said cap nuts, yielding thrust receiving raceway members for the balls, anti-friction roller bearings disposed with their axes concentric to the axes of the pivot studs and interposed between the annular surface of the body of each stud and the concentric wall of the receiving member therefor, and race members for the balls of the ball bearings receivable within the housings and adapted to confine the balls to annular paths concentric to the axes of the pivot studs.

3. In a steering axle structure, the combination of an axle supporting member having two vertically disposed oppositely projecting pivot studs, tubular housing members receiving said studs, socketed cap nuts closing the outer ends of the housings, a plurality of button-shaped thrust bearing members interposed between the ends of the pivot studs and the bases of the sockets in the cap nuts, anti-friction balls interposed between two of said thrust bearing members and confined laterally by the annular wall of the socket in the cap nut, and anti-friction bearing members interposed between the bodies of the studs and the concentric walls of the stud receiving housings.

WILLIAM D. LEGGE.
CURRAN C. McCONVILLE.